Sept. 10, 1968  R. A. CRESSWELL ET AL  3,400,540
JET NOZZLE CHAIN DRIVE AND MOUNTING MEANS THEREFOR
Filed May 15, 1967  2 Sheets-Sheet 1
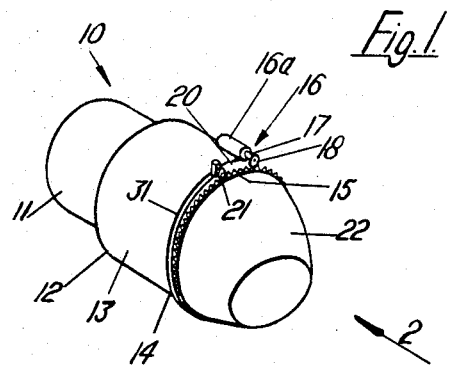
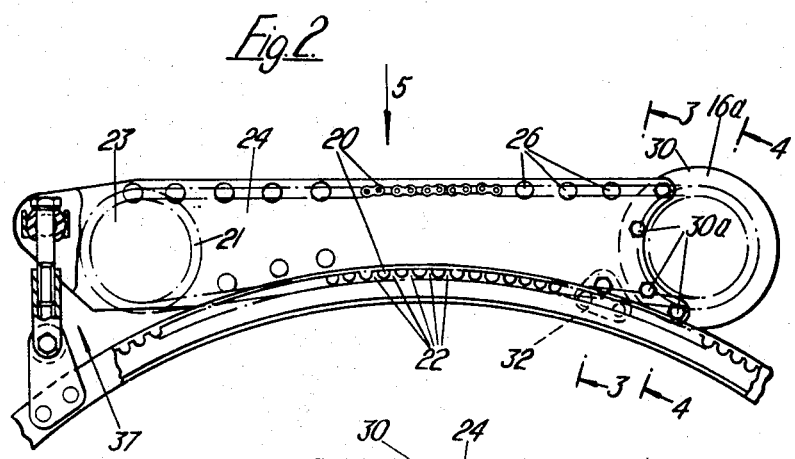
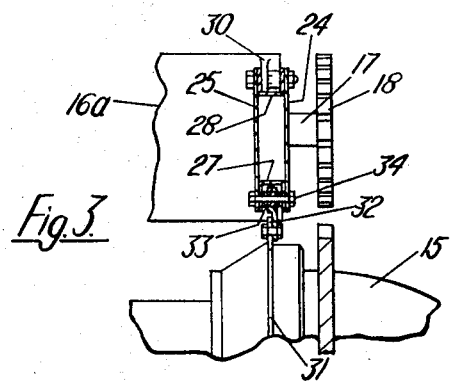
Inventors
Roger Anthony Cresswell
George Samuel Kitson
By
Cushman, Darby · Cushman
Attorneys

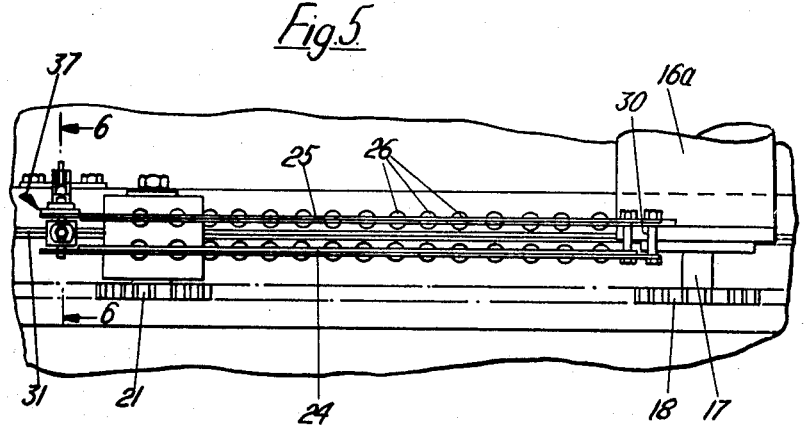
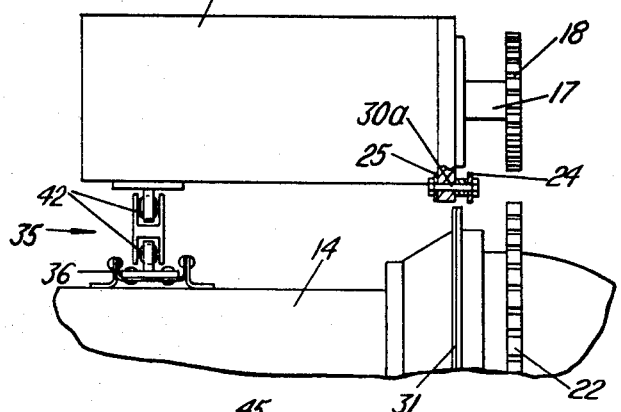
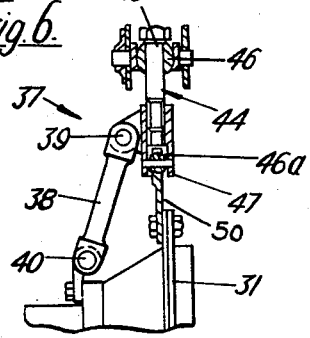

United States Patent Office 3,400,540
Patented Sept. 10, 1968

3,400,540
JET NOZZLE CHAIN DRIVE AND MOUNTING
MEANS THEREFOR
Roger A. Cresswell, Derby, and George Samuel Kitson,
Aspley, England, assignors to Rolls-Royce Limited,
Derby, England, a British company
Filed May 15, 1967, Ser. No. 638,480
Claims priority, application Great Britain, June 8, 1966,
25,424/66
3 Claims. (Cl. 60—232)

ABSTRACT OF THE DISCLOSURE

A gas turbine jet propulsion engine has a rotable nozzle. The nozzle derives its rotation from a motorized sprocket tooth and chain arrangement, the sprocket teeth being fitted around the outer periphery of the upstream end of the nozzle and the motor and chain being mounted as one assembly, on the jet pipe. The mounting comprises a plurality of spherically jointed links which absorb any movement which takes place between the motor and chain assembly and jet pipe as a result of differential expansion, thus maintaining a nearly constant amount of drive contact between the chain and sprocket teeth.

---

This invention concerns drive mechanisms.

According to the present invention there is provided drive means adapted to rotate a first member relative to a second member, the first member being rotatably connected thereto, said drive means being attached to the second member by a plurality of mounting members whereby the undesirable effects on the drive connection between said drive means and said first member, of dimensional and positional variations of the members relative to each other as a result of temperature changes in said second member and said drive means, is substantially nullified.

In the preferred embodiment, the first and second members respectively comprise the rotatable exhaust nozzle and jet pipe of a gas turbine engine, and the drive means comprises an air motor or the like, arranged to drive a pair of sprocket wheels connected by a chain, the chain being arranged so as to drivingly contact a sprocket gear mounted on, and encircling the upstream end of, the rotatable first member.

The invention will now be described with reference to the accompanying drawings in which:

FIGURE 1 is a pictorial view of a gas turbine engine provided with a rotatable nozzle and drive means for rotating the nozzle.

FIGURE 2 is a view in the direction of arrow 2 in FIGURE 1.

FIGURE 3 is a section on line 3—3 in FIGURE 2.

FIGURE 4 is a section on line 4—4 in FIGURE 2.

FIGURE 5 is a view in the direction of arrow 5 in FIGURE 2.

FIGURE 6 is a section on line 6—6 in FIGURE 5.

Referring to FIGURE 1, a gas turbine engine 10 comprises compressor means 11, combustion equipment 12, turbine means 13, a jet pipe 14 and a rotating exhaust nozzle 15, all arranged in flow series. A drive mechanism 16 in the form of an air motor 16a or the like, is attached to the outer surface of jet pipe 14. The downstream end of the motor drive shaft 17 (seen more clearly in FIGURE 3) has a sprocket gear 18 keyed to it, and an endless chain 20 is drivingly supported by this gear, the chain being further supported by a second sprocket gear 21 which is free to rotate about its own axis. The motor 16a, sprocket gears 18–21 and chain 20 are assembled and mounted in a manner which enables the lower centre portion of chain 20 to engage in drive contact with a plurality of teeth 22 which, with other teeth, make up a complete ring of sprocket gear teeth, the ring of sprocket gear teeth being formed integrally with and around, or rigidly attached to and around, the upstream end of nozzle 15. Thus if nozzle 15 is required to be rotated, drive mechanism 16 is actuated so as to rotate sprocket gear 18, which in turn causes chain 20 to move with a caterpillar track motion around sprocket gears 18–21, and as it does so, transmit a substantially tangential drive motion to the sprocket teeth 22 of nozzle 15, thereby rotating the nozzle.

Sprocket wheel 21 rotates in a bearing housing 23 mounted between carrier plates 24–25, said plates 24–25 being maintained in spaced apart relationship to each other by rivetted spacer members 27–28, the rivets being designated 26.

The ends of carrier plates 24–25 remote from said housing, are attached to a flanged portion 30 on the motor, by setscrews 30a. Thus, the motor 16a, sprocket gears 18–21 and carrier plates 24–25 comprise a rigid assembly.

The upstream end of exhaust nozzle 15 is adapted to form the inner race of a bearing (not shown) and the downstrtam end of jet pipe 14 is adapted to form the outer race of said bearing, whereby the exhaust nozzle 15 may rotate relative to jet pipe 14.

A flange 31 is provided around the periphery of the downstream end of jet pipe 14 and a bracket 32 is rigidly attached thereto. The upper end 33 of bracket 32 comprises a spherical joint to which drive-mechanism 16 is connected, via carrier plates 24–25 and bolt 34.

The drive mechanism 16 is further supported by a single link 35 having a spherical joint on both ends, said link 35 being situated at the upstream end of the motor 16a, (FIGURE 4). The radially inner end of the link 35 is rigidly attached via a bracket and sole plate 36, to jet pipe 14.

A double link arrangement 37 is provided at the end of carrier plate assembly 24–25, adjacent sprocket gear 21, whereby the drive mechanism is prevented from excessive rotation about the centre of spherical joint 33, the double link arrangement 37 comprising a link 38 which is connected to the downstream end of jet pipe 14 by spherical joint 40, and is connected at its opposite end by a plain joint 39, to a further link 44. The radially outer end of link 44 is connected by a spherical joint 46 to carrier plate assembly 24–25, and the opposite end of link 44 is connected by a further spherical joint 46a, to a bracket 50 which in turn is rigidly connected to flange 31 on jet pipe 14.

Thus it will be seen in this three point spherical joint suspension system that by placing the single spherical datum joint 33 near to the drive contact area between chain 20 and sprocket ring 22, the greatest compound twisting movement which the drive mechanism will experience as a result of radial and axial differential expansion in jet pipe 14, and drive mechanism 16, will take place at the parts of the drive mechanism 16 furthest away from the drive contact area i.e. the upstream end of motor 16a, thereby maintaining a substantially constant drive contact between chain 20 and sprocket gear 22.

Reference to FIGURES 2 and 6 shows that link 44 comprises a bolt 45 rotatably mounted in a spherical portion 46, and in screw threaded engagement with a bush 47, said bush 47 having a further spherical joint at its lower end. Screwing bolt 45 in or out of bush 47, causes drive mechanism 16 to pivot about joint 33, thereby causing chain 20 to engage with, or disengage from sprocket gear 22. Thus the tension of chain 20 may be adjusted.

We claim:

1. A gas turbine jet propulsion engine, a jet pipe connected thereto, a propulsion nozzle rotatably connected to the jet pipe for rotation about the axis thereof, a motor and sprocket chain assembly connected by connecting means to the jet pipe, the chain portion of the motor and chain assembly being engaged in rotational drive contact with at least a portion of a ring of sprocket teeth on said propulsion nozzle, the connecting means being adapted to permit movement between the motor and jet pipe whilst maintaining a substantially constant amount of drive contact between said chain portion and said portion of the ring of sprocket teeth.

2. An engine as claimed in claim 1 wherein the connecting means comprises a plurality of link members joined by spherical joints to said motor and chain assembly and said jet pipe except for one link member, said one link member being joined by a spherical joint to said motor and chain assembly, and joined by a rigid joint to said jet pipe.

3. An engine as claimed in claim 2 wherein said one link member is positioned substantially adjacent the place of drive contact between the chain portion and the portion of the ring of sprocket teeth.

References Cited

UNITED STATES PATENTS

| | | | |
|---|---|---|---|
| 889,152 | 5/1908 | Rockwell | 74—228 |
| 2,148,370 | 2/1939 | Edgington | 74—221 XR |
| 2,758,487 | 8/1956 | Erickson | 74—221 XR |
| 3,098,464 | 7/1963 | Holland | 60—232 XR |
| 3,146,589 | 9/1964 | Twyford | 60—232 |

CARLTON R. CROYLE, *Primary Examiner.*